Sept. 25, 1956

J. E. JACOBS ET AL 2,764,693

PROCESS AND APPARATUS FOR IMAGE
PRODUCTION AND RECORDATION
Filed May 25, 1951

INVENTORS:—
JOHN E. JACOBS
RUDOLF FRERICHS
BY:—

Spencer, Johnston, Cook & Root
ATT'YS

2,764,693
Patented Sept. 25, 1956

2,764,693

PROCESS AND APPARATUS FOR IMAGE PRODUCTION AND RECORDATION

John E. Jacobs, Oconomowoc, Wis., and Rudolf Frerichs, Evanston, Ill., assignors to General Electric Company, a corporation of New York Application May 25, 1951, Serial No. 228,334

13 Claims. (Cl. 250—65)

The present invention relates in general to the production and recordation of images, including images carried by visible light rays, as well as those contained in invisible light emanations such as infrared, ultraviolet, and X-rays.

Light, broadly speaking, comprises energy emanations or rays of vibratory character and having wave lengths within the range of the light spectrum, including so-called gamma rays having wave lengths within the range from 0.07 to 0.1 Angstrom, rays having wave lengths shorter than 0.07 Angstrom, X-rays within the wave length range from 0.1 to 1.5 Angstroms, ultraviolet rays having wave lengths substantially greater than the wave length of X-rays but less than 3800 Angstroms, visible light rays within the wave length range from 3800 to 8000 Angstroms, infrared rays within the wave length range between 8000 Angstroms and 0.03 centimeter, and electromagnetic waves having wave lengths within the wave length range from a fraction of a centimeter to many thousands of meters.

An inherent characteristic or phenomenon of light rays of any wave length is the ability of the ray to receive and carry images of objects upon which the same impinges, such images being established in the light waves by modulation thereof in accordance with the characteristics of the object or article upon which the waves have impinged. Light rays thus modulated may be said to contain a latent image of the object, and such latent image may be made apparent by applying the modulated light rays to suitable translation or conversion means sensitive to the rays or otherwise capable of producing the image, either transiently or permanently, in visible or otherwise perceptible form.

The mechanism of the human eye, for example, comprises specialized means, sensitive to visible light, for the translation to perceptible condition of transient images latently contained in visible light rays applied to the retina of the eye. Camera obscura, viewing screens and like mechanism or apparatus, including lenses, light boxes and the like, also are adapted for the production of images latently contained in visible light rays. Sensitive screens, including screens sensitive to visible light as well as to infra red and ultra violet rays, X-rays and other invisible light emanations, are commonly employed for producing images in perceptible form in response to impingement thereon of rays containing the corresponding latent images.

The arts of photography and xerography pertain specifically to the reduction of latent images contained in visible and invisible light rays to perceivable, that is to say, visible condition, and the recordation of such images, such procedures involving the application of the image containing ray to a sensitive medium to alter the same in accordance with the characteristics of the image and thereby, in a sense, to entrap the features of the image in the medium, and the development of such entrapped image features to perceivable or visible condition, in or on the medium.

In photography, for example, the image to be produced, after having been trapped in a light sensitive layer, by exposure thereof to the image containing rays, is intensified or amplified by chemical action in the light sensitive material, and then developed to visible condition as a record of the image in said layer.

In xerography, the sensitive medium is a layer of material, all portions of which may be charged electrically to the same potential. The layer may then be exposed to rays containing the latent image to be produced and recorded. Upon such exposure each and every portion of the sensitive layer loses its electrical charge in proportion to the degree of intensity of light radiation to which it has been subjected. Powder is then dusted upon the layer and adheres thereto in proportion to the charged condition of the several portions of the layer, whereby the image to be produced is accomplished in terms of the dust particles adhering to the layer. Such dust image may then be transferred to a suitable carrying layer coated with adhesive for securing the dust image or pattern as a record upon the carrying layer. In xerography, intensification of the image is accomplished mechanically by the image forming dust, the particles of which, being relatively large, provide the image in visible condition.

It will be seen from the foregoing that image production and reproduction by the photographic process involves chemical action for the intensification and development of an image as a record in sensitive material previously exposed for the entrapment of the image on the material; and that the xerographic procedure involves the employment of dust as an intensifying medium selectively attracted, by electrostatic action, upon a plate previously irradiated for the entrapment of the image as an electrostatic pattern in the plate.

An important object of the present invention is to provide an entirely new method and apparatus for the production and recordation of images by utilizing electrodynamic means as distinguished from the electrostatic and chemical phenomena employed respectively in xerography and photography; a further object being to produce images in terms of electrical currents, flowing in each and every portion of an image producing area, whereby the image may be recorded by applying the currents directly to a current sensitive sheet to mark the same, thereby reducing the recording procedure to one of utmost speed, precision and simplicity by avoiding the chemical procedures inherent to photography and the mechanical dust pattern transfer procedure of xerography.

Another important object is to produce and record images by providing a sensitive plate or layer adapted to be irradiated by light rays in accordance with the image to be produced and recorded, the layer comprising material adapted to produce magnified or amplified electrical currents, in the many unit areas thereof, in proportion to the intensity of irradiation of such areas, whereby the image is produced in terms of amplified electrical currents throughout the image area; a further object being to record the image thus produced on material sensitive to the electrical currents flowing in the various portions of the image area.

Another important object is to produce and record images by irradiating a sensitive layer comprising crystals of cadmium or mercury sulphide, or cadmium selenide, or other semi-conducting material having the inherent capacity of operating as an electrical current amplifier when irradiated with light rays, and then applying such amplified currents through a layer of recording material adapted to change color in proportion to the extent of electrical current flow therethrough.

Another important object is to provide an image recording apparatus or camera comprising a screen or layer of crystalline material of the sort in which each crystal is adapted to function as an electrical current amplifier, in proportion to the intensity of irradiation thereof by light, including means to support a suitable recording sheet in the camera in position, with respect to the screen, to receive electrical current therethrough from the screen, whereby, upon application of light rays containing the latent image to be reproduced upon the screen, a corresponding image may be produced on the screen, in terms of current flow in its constituent crystals, and recorded by applying such current flow for the electrical marking of the recording sheet.

Another important object is to provide for the recording of an image on a suitable record sheet in response to irradiation of the screen, and the simultaneous application of electrical potential on said screen to activate the same and to drive the amplified electrical currents from the crystals of the screen through the recording sheet; a further object being to provide apparatus in which the image will not be produced in the screen, or recorded, even though the image modulated light beam be applied to the screen, image production and recordation being accomplished only upon application to the screen of actuating potential, as from a suitable external power source, in order to operate the constituent crystals of the screen as current amplifiers, under control of the irradiating light ray.

Another important object is to form the sensitive screen as a layer of finely divided crystals of current amplifying material adhered as a relatively thin, uniform layer, as on a suitable backing sheet; a further object being to form a face of the screen with an overlying layer of electrical conducting material arranged as a grill or grid, of preferably fine grain and through which grid the recording electrical currents may be delivered from the amplifying screen to the electrically sensitive recording sheet, to thereby mark the same in accordance with the currents generated in the various areas of the sheet as the result of irradiation thereof.

Another important object is to provide a screen comprising elongated crystals in side by side, relatively closely packed relationship and mutually insulated each from the others, the axes of the individual crystals extending preferably normally with respect to the opposite faces of the layer, whereby to confine the electrical current developed in each crystal to the corresponding area of a recording sheet applied in contact with a face of the screen comprising the ends of the crystals.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Figure 1:
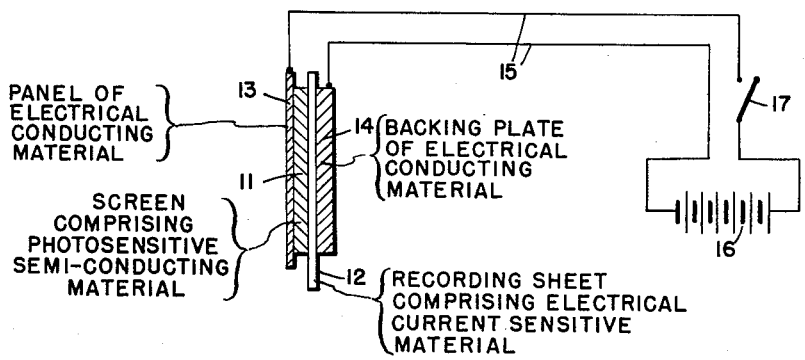
Fig. 1 is a schematic showing of image producing and recording apparatus embodying the present invention.

To illustrate the invention, the drawings show image producing and recording apparatus comprising a layer or screen 11 of photosensitive semi-conducting material having electrical amplifying characteristics upon exposure to light rays, and means to apply electrical currents generated in said screen to a recording sheet 12 of material which is sensitive to electricity. To this end, one side of the screen 11 may be secured preferably in intimate superficial electrical contact with a panel or layer 13 of electrical conducting material; and suitable means, of course, may be provided for mounting the screen 11 and panel 13 in operative position. Means, such as a backing plate 14, of electrical conducting material, may be provided for holding the electrically sensitive recording sheet 12 in intimate superficial contact with the surface of the screen 11 remote from the layer 13; and, of course, suitable means may be provided for supporting the plate 14 in operative position with respect to the panel, and for moving the plate toward and away from the panel in order to press the recording sheet 12 in operative position between the screen and the plate, and to separate the screen and plate for the application and removal of the sheet to and from mounted position therebetween. Suitable conductor means 15 may be provided for electrically connecting the panel or layer 13 and the backing plate 14 with a suitable source of electrical power, such as the battery 16, the connection being preferably controlled by a switch 17.

The screen 11 comprises photosensitive semi-conductor material of the sort affording current amplification characteristics in proportion to the intensity of irradiating light rays, of which cadmium sulphide ($CdS$), cadmium (CdSe), and mercuric sulphide ($HgS$) are examples.

For the purposes of demonstrating the present invention, a semi-conductor may be defined as a substance having electrical resistance, or reactance, or both, which vary in accordance with the intensity of light rays to which the substance is exposed. A semi-conductor, in the absence of rays to which it responds, may have impedance characteristics of such high order as to constitute it as an insulator capable of substantially preventing the flow of electrical power therethrough, the impedance of the material, when irradiated with rays to which it is responsive as a semi-conductor, being reduced as a proportional function of incident ray intensity, whereby the material becomes electrically conducting in proportion to the intensity of the exciting rays impinging thereon.

Semi-conductors operate as such through the release of electrons entrapped in the material, such electron release being accomplished as the result of ray impingement on the material. Commonly known semi-conductors, such, as selenium, operate to release electrons in direct proportion to the alteration of the electrical space charge of the substance as the result of light impingement. Semi-conductors, such as the sulphides of cadmium and mercury and the selenide of cadmium, which show amplification characteristics, operate by releasing many thousands of hundreds of thousands of electrons in response to unit alteration of the space charge. As a consequence, each crystal of a conductor having amplification characteristics operate, when excited by the impingement of light rays thereon, in fashion comparable to the operation of an electronic amplifying device, whereas selenium and other common semi-conductors do not show the amplifying characteristic.

The present invention takes advantage of electrical current amplification characteristics of selected semi-conductors having such characteristics, in order to constitute the screen 11 as what may be termed a two-dimensional or area amplifier, in which each minute zone, comprising a crystal of the constituent material, constitutes a tiny amplifier capable of delivering a substantial quantity of electrical current proportional to the intensity of the impinging light ray, whereby the current so delivered may be passed through a recording sheet, in surface contact with the screen 11. As a consequence, the recording sheet may receive an image corresponding exactly with the intensities of electrical current delivered by each of the constituent parts of the screen, the same, in turn, being proportional to the light intensity to which the constituent particles of the screen are or have been irradiated.

In this connection, it is thought that the amplifying character of the crystals is due to the fact that cadmium and mercuric sulphides and cadmium selenide comprise excess electron or electron donor type semi-conductor crystals. As a consequence, the excess energy necessary to produce the amplified current in the crystal is derived from the electron producing character of the material itself when irradiated or triggered by exposure to light rays. It is thought that electron donor centers in each crystal are ionized by the ray, thus forming stationary positive space charges.

This phenomenon can be compared to a conventional triode tube where the grid is assumed to be floating. In such a tube the grid takes up a negative charge from the electron flow, thus reducing the plate current to a small value. However, if the grid is charged positive, the current will increase. In the crystal the conduction electrons are, to a large extent, localized in the traps, thus forming the current reducing stationary negative space charge. When the ray impinges, the electron donors are ionized, thus assuming positive charge. The stationary positive charges created in the crystal act in the same way as the positive charges on the grid of a triode. One positive hole, so created in the crystal, appears to control the flow of more than 10,000 electrons through the crystal. This is in contradistinction to ordinary photoconductors, such as selenium, where this amplification mechanism is absent.

As a consequence, electrical energy is released in the form of current in the crystal that is many times the energy applied to the crystal by the light ray, the battery 16 and its circuit being primarily to cause the crystal currents to flow from all areas of the screen 11 directly through the record sheet 12 to the backing plate 14, to thereby mark the paper in accordance with the current flow therethrough in all of the crystal contacting areas thereof. While the potential of the battery 16 is not critical, it should be of such a value that the potential gradient across the screen 11 is of the order of from 1,000 to 5,000 volts per centimeter. For example, where the screen 11 is of the order of 0.1 centimeter in thickness, the source should provide electrical potential of the order of 100 to 500 volts.

The layer 13 may, of course, comprise any suitable conducting material through which to connect the power source 16 with all of the amplifying crystals forming the surface of the screen 11 which is in contact with the layer 13. To this end, the layer 13 preferably comprises material that is transparent to the image modulated rays, impingement of which upon the screen 11 for image producing and recording purposes may be desired. In this connection, the layer 13 may comprise stannous chloride, which is electrically conducting and which, also, is transparent to visible light as well as to invisible rays. Where the layer 13 comprises stannous chloride or other electrical conducting material that is transparent to visible light, the present invention may be applied in making light ray pictures merely by providing suitable conventional ray focusing means, such as a camera lens or pinhole structure, for focusing the visual light rays, modulated in accordance with the scene to be pictured, upon the screen 11 through the transparent layer 13, suitable enclosure means being provided between the focusing means and the layer to exclude interfering light rays.

In such an arrangement, the conventional camera shutter for exposure timing purposes is unnecessary, since the recording process does not become effective until the energy source 16 is connected between the layer 13 and plate 14, as by closure of the switch. So long as the external power source circuit remains open, the image producing and recording process remains inactive, even though image modulated rays may be impinging upon the screen 11. Exposure timing, in accordance with the present invention, is accomplished by regulating the period during which the switch 17 remains closed, and is, of course, determined by the sensitivity of the record sheet 12 to the passage of electrical currents therethrough. Exposure timing, however, is not particularly critical.

The present invention, of course, is not at all limited to the production and recordation of visible light ray images. On the contrary, it is equally applicable to the production of recorded images latently carried in X-rays, ultra violet and infra red rays, gamma rays, and in fact any rays capable of exciting the constituent material of the screen 11. Where employed in producing and recording X-ray and other invisible ray images, the layer 13 may comprise any electrical conducting material through which the rays may pass. In this connection, the layer 13 may comprise a thin sheet or film of metal; and in making X-ray images it is not even necessary to apply the image carrying rays upon the screen 11 through the layer 13, but such rays may be applied to the screen through the plate 14 and the record sheet 12 if desired, the same being merely a matter of impinging the rays upon the constituent crystals of the screen 11.

The screen 11 may be made by finely grinding crystals of the material employed and securing them together to form a layer, as by compressing and firing the crystals in an atmosphere of hydrogen sulphide, to form a substantially homogeneous, compact layer of desired area having thickness of the order of 1/32 to 1/16 inch. The thickness of the screen is not particularly critical, although the thinner the sheet the sharper the definition of the resulting recorded image, for the reason that as plate thickness increases, the current developed in any crystal will spread in proportion to screen thickness traveled by the current in reaching the record sheet. Accordingly, the record sheeet area affected by the current delivered from a crystal will be proportional to the screen thickness through which such current must pass. In providing screens for producing and recording images from rays of penetrating character, such as X-rays, it is desirable to make the screen 11 of such thickness as to completely absorb the impinging rays, in order that all of the energy of such rays be converted by the screen for image recording purposes. As a consequence, the thickness of the screen is preferably determined as a compromise between the thickness required for total ray absorption and the thickness limitation imposed by the definition required in the recorded image. Where rays of nonpenetrating character are involved, the screen 11 may have minimum thickness, limited only by mechanical considerations in the making of the screen.

The screen 11 may also be produced by spraying the finely divided crystal material upon a static layer of conductive material, such as a thin sheet of metal, paper or other fabric impregnated with graphite, the layer being coated with a suitable conductive adhesive, such as phosphoric acid, colloidal graphite, or the like.

Figure 3:
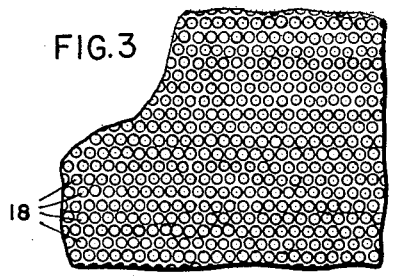
Fig. 3 is a face view of the element shown in Fig. 2.
Figure 2:
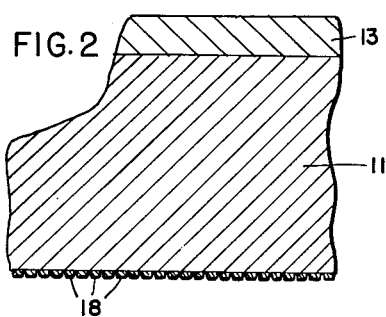
Fig. 2 is an enlarged sectional view through an element of the combination shown in Fig. 1.

The exposed faces of the constituent crystals of the screen, especially in the surface thereof which faces the record sheet 12, are preferably covered or coated with a humidity excluding substance of electrical conducting material, such as selenium. It may also be desirable to provide the record sheet engaging face of the screen with current transferring contact means, preferably in the form of closely spaced projections formed in said surface. These projections 13, as shown more particularly in Figs. 2 and 3 of the drawings, may comprise electrical conducting material which may be sprayed upon the surface, as through a foraminous screen of fine mesh of the order of 250 openings per linear inch. These projections 18 form a conductive grid which serves to apply the image recording crystal currents upon the record sheet 12 in the contact areas of the sheet with the projections 18, whereby the resulting record consists of a picture comprising multitudinous dots of varying color contrast value in the record sheet.

Figure 4:
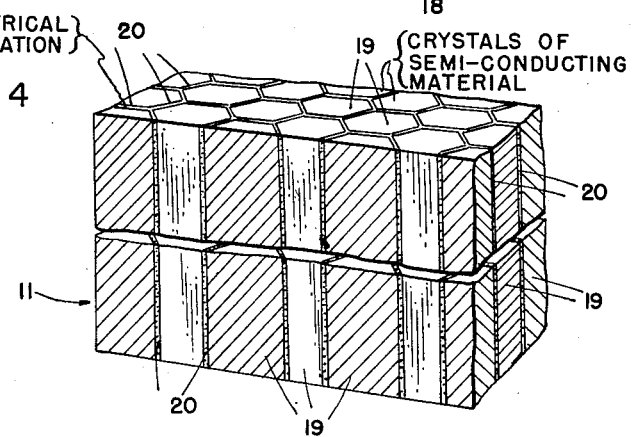
Fig. 4 is a perspective view, partially in section, showing a modified form of the element.

The screen 11, as shown more particularly in Fig. 4 of the drawings, may comprise a multiplicity of individual elongated crystals 19 of the screen material, such elongated crystals being arranged in parallel, closely spaced and side by side relationship in the screen layer, with the longitudinal axes of the crystal elements 19 extending across the screen, in position substantially normal to the opposite faces thereof. In such arrangement, the opposite ends of the crystals are exposed at the opposite sides of the screen, and the crystals may be held and secured together, as by means of suitable cementitious material 20, having insulating characteristics, disposed therebetween for the purpose of insulating each of the crystals from the others. Any suitable insulating material may be used for the purpose, including polystyrene;

the reaction product of glycerine and thalic anhydride, arsenic trisulphide, or other readily meltable organic insulating substance, preferably fusable at temperatures of the order of 200° C. Since the crystals 19 may have substantial length as compared with the transverse or diametral dimension thereof, the medial portions thereof are broken out and omitted in the Fig. 4 showing, which illustrates the opposite end portions only of the elongated crystals 19 forming the panel or screen 11.

Such a screen, although somewhat expensive as compared with those previously described, may have appreciable thickness, substantially in excess of ¼ inch, and limited only by the length of available crystal elements 19, without any loss or impairment in the definition of the recorded image due to current spread in traveling through the screen to the recording sheet. Each crystal 19, being mutually insulated from the adjoining crystals, will deliver each its corresponding current directly to the recording sheet, thereby affording optimum definition in the recorded image. A sheet made in the fashion shown in Fig. 4, accordingly, is particularly useful in recording, with maximum definition, latent images carried in penetrating rays, especially so-called "hard" X-rays.

Each photosensitive semi-conductor, of course, has its own individual light responsive amplifying characteristics. Cadmium sulphide, for example, exhibits its current amplifying characteristics upon exposure to rays having wave length below 5200 Angstrom units, including visible light rays in the green, blue, and violet areas of the spectrum, X-rays and gamma rays, as well as rays comprising alpha particles, and beta particles or electrons. Cadmium sulphide thus is responsive to all kinds of irradiation having wave length below that of red light in the visible spectrum.

The other photosensitive semi-conductors having current amplifying characteristics exhibit comparable limitations. These limitations, however, do not prevent the production and recordation of images latently contained in rays to which the semi-conductor does not respond. On the contrary, the present invention embraces the production and recordation of ray images contained in light to which the photosensitive material does not respond. For example, where cadmium sulphide is employed as the sensitive screen material, the screen may be continuously irradiated at constant intensity with rays to which the screen is responsive. To this end, the screen 11 may be exposed to green or other light having wave length of less than 5200 Angstrom units. By exposing such screen, while the same is thus constantly biased with light, to which the screen is responsive, to image carrying rays, such as infrared rays having wave length in excess of 5200 Angstrom units, the latent image contained in such infrared rays may be recorded by a subtraction process. In this connection, the crystal current flow inducing effect of the constant light bias will be reduced to modify such crystal currents in accordance with the ray intensities forming the latent image carried in the infrared rays impinging on the screen. As a consequence, such latent image may be recorded, on the record sheeet 12, as an inverted image comprising a negative picture of the image.

The record sheet 12 may comprise any suitable or preferred material adapted to change color in response to the passage of electrical current therethrough. To this end, the sheet may be impregnated with any desired substance having color responsive characteristics, the color change in the material being accomplished by the alternation of the pH character of the material in response to the flow of electrical current therethrough. Numerous substances having such characteristic are well known. A suitable record sheet, for example, may be produced by treating a sheet of preferably white paper with a solution of sodium chloride and phenolphthalein. Such treated paper will turn a reddish color upon exposure to electrical current, the density of the color being substantially proportional to the quanta of current to which exposed. A sheet of paper treated with potassium iodide and starch will turn black. The color change thus accomplished in the record sheet may be the result either of oxidation or reduction of the current responsive chemical substance in the sheet. The action will take place in the surface of the sheet which is in electrical contact with the positive or negative side of the power source 16, depending upon the oxidizing or reducing action required by the chemical nature of the sensitive component of the recording sheet. Accordingly, it is desirable to control the polarity of the power source 16, depending upon the nature of the record sheet 12.

It will be seen from the foregoing that the present invention contemplates the provision of a light responsive screen forming a mosaic comprising a multiplicity of adjacently disposed crystals, each of which is adapted to act as a current amplifier controlled by the light impinging thereon. The screen thus comprises what may conveniently be termed as area or two-dimensional amplifying mosaic, every constituent crystal of which may operate to transmit, at a surface of the screen, an amplified current corresponding in value with the intensity at which the crystal is irradiated, the invention not only embracing the amplifying screen, but including the novel method of translating latent images contained in light rays to a pattern comprising values of electrical current presented in a pre-defined plane and thus made effective for examination and recordation.

It will be seen, also, that the method and apparatus of the present invention provide exceedingly simple and inexpensive means for the translation and recordation of light images, throughout the entire spectrum, including invisible as well as visible light rays; and that the present invention affords considerable saving in time and expense, and greatly simplifies the making of record pictures of latent light ray images.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. An image translating apparatus embodying a screen comprising granular, crystalline semi-conductor material having current amplifying characteristics, said granular material being compressed and compacted to form a layer of substantially uniform thickness in which the grains of said material are adapted to be irradiated by image carrying rays for operation each as a current amplifier in accordance with the energy intensity of rays impinging thereon, a panel of conductive material transparent to image carrying rays disposed in electrical contact with one face of the layer, a plate of electrical conducting material adapted to overlie the other face of said layer to support a current sensitive recording sheet between and in contact with said plate and said other face of said layer, and a humidity excluding film of electrical conducting material covering the record sheet engaging surface of said layer.

2. An image translating apparatus embodying a screen comprising granular, crystalline semi-conductor material having current amplifying characteristics, selected from the class including cadmium sulphide, cadmium selenide, and mercuric sulphide, said granular material being compressed and compacted to form a layer of substantially uniform thickness in which the grains of said material are adapted to be irradiated by image carrying rays for operation each as a current amplifier in accordance with the energy intensity of rays impinging thereon, a panel of conductive material transparent to image carrying rays disposed in electrical contact with one face of the layer, a plate of electrical conducting material adapted to overlie the other face of said layer to support a current sensitive recording sheet between and in contact with said plate and said other face of said layer, and a humidity excluding film of electrical conducting material covering the record sheet engaging surface of said layer.

3. An image translating apparatus embodying a screen comprising light sensitive electrical current amplifying elements forming a layer, in which said elements are adapted to be irradiated by image carrying rays for the operation of each element as a current amplifier in accordance with the energy intensity of rays impinging thereon, a panel of conductive material transparent to image carrying rays disposed in electrical contact with one face of the layer, a plate of electrical conducting material adapted to overlie the other face of said layer to support a current sensitive recording sheet between and in contact with said plate and said other face of said layer, and a humidity excluding film of electrical conducting material covering the record sheet engaging surface of said layer.

4. An image translating apparatus embodying a screen comprising photosensitive, semi-conductor material having electrical current amplifying characteristics, the material being formed as a multiplicity of individual amplifying elements, supported as a layer in which the elements are substantially uniformly distributed throughout the area of the screen, a panel of conductive material transparent to image carrying rays disposed in electrical contact with one face of the layer, a plate of electrical conducting material adapted to overlie the other face of said layer to support a current sensitive recording sheet between and in contact with said plate and said other face of said layer, and a humidity excluding film of electrical conducting material covering the record sheet engaging surface of said layer.

5. An image translating apparatus embodying a screen comprising cadmium sulphide crystal elements, forming a layer in which the elements are substantially uniformly distributed throughout the area of the screen, a panel of conductive material transparent to image carrying rays disposed in electrical contact with one face of the layer, a plate of electrical conducting material adapted to overlie the other face of said layer to support a current sensitive recording sheet between and in contact with said plate and said other face of said layer, and a humidity excluding film of electrical conducting material covering the record sheet engaging surface of said layer.

6. An image translating screen comprising elongated cadmium sulphide crystal elements disposed in side-by-side, closely packed relation in the screen and relatively insulated each from the other, the opposite ends of said elements extending at the opposite faces of the screen.

7. An image translating apparatus embodying a screen comprising mercuric sulphide crystal elements, forming a layer in which the elements are substantially uniformly distributed throughout the area of the screen, a panel of conductive material transparent to image carrying rays disposed in electrical contact with one face of the layer, a plate of electrical conducting material adapted to overlie the other face of said layer to support a current sensitive recording sheet between and in contact with said plate and said other face of said layer, and a humidity excluding film of electrical conducting material covering the record sheet engaging surface of said layer.

8. An image translating screen comprising elongated mercuric sulphide crystal elements disposed in side-by-side, closely packed relation in the screen and relatively insulated each from the other, the opposite ends of said elements extending at the opposite faces of the screen.

9. An image translating apparatus embodying a screen comprising cadmium selenide crystal elements, forming a layer in which the elements are substantially uniformly distributed throughout the area of the screen, a panel of conductive material transparent to image carrying rays disposed in electrical contact with one face of the layer, a plate of electrical conducting material adapted to overlie the other face of said layer to support a current sensitive recording sheet between and in contact with said plate and said other face of said layer, and a humidity excluding film of electrical conducting material covering the record sheet engaging surface of said layer.

10. An image translating screen comprising elongated cadmium selenide crystal elements disposed in side-by-side, closely packed relation in the screen and relatively insulated each from the other, the opposite ends of said elements extending at the opposite faces of the screen.

11. Image translating apparatus comprising a screen for receiving the impingement of image modulated rays upon said screen, said screen comprising a layer of photosensitive, semi-conductor material having current amplifying characteristics and forming a multiplicity of individual amplifying elements substantially uniformly distributed throughout the layer, a panel of conductive material transparent to the image modulated rays overlying one face of said layer in electrical contact with the constituent amplifying elements thereof, a plate of electrical conducting material mounted in position to overlie the other face of said layer to support a current sensitive recording sheet in surface contact with said other face, and circuit means for controllably connecting said panel and plate with an electrical power source for delivering electrical current through said panel and plate and a recording sheet in surface contact therewith, said layer including a multiplicity of spaced, current conducting and sheet contacting areas constituting the sheet engaging portions of the layer, whereby to apply the electrical currents flowing in each unit portion thereof through the corresponding portions of the recording sheet.

12. Image translating apparatus comprising a screen for receiving the impingement of image modulated rays upon said screen, said screen comprising a layer of photosensitive, semi-conductor material having current amplifying characteristics and forming a multiplicity of individual amplifying elements substantially uniformly distributed throughout the layer, a panel of conductive material transparent to the image modulated rays overlying one face of said layer in electrical contact with the constituent amplifying elements thereof, a plate of electrical conducting material mounted in position to overlie the other face of said layer to support a current sensitive recording sheet in surface contact with said other face, and circuit means for controllably connecting said panel and plate with an electrical power source for delivering electrical current through said panel and plate and a recording sheet in surface contact therewith, the sheet engaging surface of the layer having a conductive grid comprising spaced apart, sheet engaging elements of conducting material, whereby to apply the electrical currents flowing in each unit portion of the screen to the corresponding portions of the recording sheet.

13. Image translating apparatus comprising a screen for receiving the impingement of image modulated rays upon said screen, said screen comprising a layer of photosensitive, semi-conductor material having current amplifying characteristics and forming a multiplicity of individual amplifying elements substantially uniformly distributed throughout the layer, a panel of conductive material transparent to the image modulated rays overlying one face of said layer in electrical contact with the constituent amplifying elements thereof, a plate of electrical conducting material mounted in position to overlie the other face of said layer to support a current sensitive recording sheet in surface contact with said other face, and circuit means for controllably connecting said panel and plate with an electrical power source for delivering electrical current through said panel and plate and a recording sheet in surface contact therewith, the amplifying elements of the screen comprising individual elongated crystals in closely packed, side by side relation and extending transversely through the screen, and means insulating the elements each from the other, the ends of said crystals forming a multiplicity of spaced, current conducting and sheet contacting areas constituting the sheet engaging portions of the layer, whereby to apply the electrical currents flowing in each unit portion of the screen to the corresponding portions of the recording sheet.

References Cited in the file of this patent

UNITED STATES PATENTS

| | | |
|---|---|---|
| 2,015,570 | Sabbah et al. | Sept. 24, 1935 |
| 2,208,455 | Glaser et al. | July 16, 1940 |
| 2,236,172 | Gray | Mar. 25, 1941 |
| 2,238,381 | Batchelor | Apr. 15, 1941 |
| 2,266,920 | Theile | Dec. 23, 1941 |
| 2,538,593 | Rose | Jan. 16, 1951 |
| 2,582,850 | Rose | Jan. 15, 1952 |
| 2,624,857 | Mager | Jan. 6, 1953 |
| 2,692,948 | Lion | Oct. 26, 1954 |

FOREIGN PATENTS

| | | |
|---|---|---|
| 188,030 | Great Britain | Oct. 23, 1922 |